United States Patent
Verdant et al.

(10) Patent No.: US 11,531,828 B2
(45) Date of Patent: Dec. 20, 2022

(54) SCENE DESCRIPTOR GENERATION SYSTEM AND METHOD

(71) Applicant: Commissariat à l'Energie Atomique et aux Energies Alternatives, Paris (FR)

(72) Inventors: Arnaud Verdant, Grenoble (FR); William Guicquero, Grenoble (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 129 days.

(21) Appl. No.: 16/946,748

(22) Filed: Jul. 3, 2020

(65) Prior Publication Data
US 2021/0012107 A1    Jan. 14, 2021

(30) Foreign Application Priority Data
Jul. 9, 2019    (FR) .................. FR1907662

(51) Int. Cl.
| | |
|---|---|
| G06K 9/00 | (2006.01) |
| G06K 9/32 | (2006.01) |
| G06K 9/62 | (2022.01) |
| G06N 3/08 | (2006.01) |

(52) U.S. Cl.
CPC ..... G06K 9/00624 (2013.01); G06K 9/00503 (2013.01); G06K 9/32 (2013.01); G06K 9/6202 (2013.01); G06N 3/08 (2013.01)

(58) Field of Classification Search
None
See application file for complete search history.

(56) References Cited

U.S. PATENT DOCUMENTS

| | | | | |
|---|---|---|---|---|
| 2013/0163870 A1* | 6/2013 | Cao | ..................... | G06K 9/00281 382/170 |
| 2015/0092982 A1* | 4/2015 | Kang | ..................... | G06T 7/194 382/103 |
| 2016/0225119 A1* | 8/2016 | Xu | ............................ | G06T 1/20 |
| 2019/0019307 A1* | 1/2019 | Dupoiron | .................. | G06T 7/73 |
| 2021/0012107 A1* | 1/2021 | Verdant | ................ | G06K 9/6202 |

FOREIGN PATENT DOCUMENTS

| | | | |
|---|---|---|---|
| EP | 3428851 A1 | 1/2019 | |
| WO | WO-2012136642 A1 * | 10/2012 | ........... G06K 9/4671 |

OTHER PUBLICATIONS

Preliminary Search Report for French Application No. 1907662 dated Apr. 16, 2020, 2 pages.

* cited by examiner

*Primary Examiner* — Delomia L Gilliard
(74) *Attorney, Agent, or Firm* — Moreno IP Law LLC

(57) ABSTRACT

The present invention relates to a scene descriptor generation system, including an image sensor including a plurality of pixels, successively supplying S binary image planes, each including a single binary value per pixel; and a processing circuit configured to, for each binary image plane supplied by the sensor (100), to implement the successive steps of: a) calculating N convolutions of the binary image plane with respectively N distinct convolution kernels, to provide N convolved images; b) generating at least one meta-image from the N convolved images supplied at step a); and c) for each of the N convolved images supplied at step a), generating a binary descriptor from said convolved image and from said at least one meta-image.

12 Claims, 3 Drawing Sheets

SCENE DESCRIPTOR GENERATION SYSTEM AND METHOD

FIELD

The present disclosure generally relates to the field of image processing, and more particularly aims at a system and a method for generating the descriptors of a scene captured by an image sensor.

BACKGROUND

In the field of image processing, there exist many applications where descriptors enabling to highlight information of interest in the image are generated, for example, to detect predetermined elements in the image and/or to implement classification operations.

The generation of descriptors in a sensor capable, during an acquisition phase, of successively supplying a plurality of binary image planes, for example, a sensor of the type described in patent applications EP1119311 and US20180124338 previously filed by the applicant.

SUMMARY

An embodiment provides a scene descriptor generation system, comprising:
an image sensor comprising a plurality of pixels, the sensor being configured to, during an acquisition phase, successively supply S binary image planes, each comprising a single binary value per pixel, S being an integer greater than or equal to 2; and
a processing circuit configured to, for each binary image plane supplied by the sensor, implement the successive steps of:
  a) calculating N convolutions of the binary image plane with respectively N distinct convolution kernels, to supply N convolved images, N being an integer greater than or equal to 2;
  b) generating at least one meta image from the N convolved images supplied at step a); and
  c) for each of the N convolved images supplied at step a), generating a binary descriptor from said convolved image and from said at least one meta-image.

According to an embodiment, the processing circuit is configured so that the N convolved images provided at step a) and said at least one meta-image generated at step b) have same dimensions, and so that each pixel value of said at least one meta-image is equal to the result of a mathematical function having as inputs the N values of pixels of same position in the N convolved images.

According to an embodiment, the processing circuit is configured so that the mathematical function comprises at least one statistical function from the group comprising the maximum, the average, the median, the minimum, and the standard deviation.

According to an embodiment, the processing circuit is configured so that the N binary descriptors supplied at step c) are binary images of same dimensions as the N convolved images supplied at step a) and as said at least one meta-image generated at step b).

According to an embodiment, the processing circuit is configured so that, for each of the N binary descriptors supplied at step c), each pixel value of the binary descriptor is equal to the result of a logic function with a binary output, the logic function receiving as an input only values from the group comprising the N values of pixels of same position in the N convolved images and the value of the pixel of same position in said at least one meta-image.

According to an embodiment, the processing circuit is further configured to, for each binary image plane supplied by the sensor, after step c), implement the step of:
  d) for each of the N binary descriptors, applying to the descriptor a pooling function to generate a binary descriptor of decreased dimensions.

According to an embodiment, the processing circuit is configured to, after step c), repeat steps a), b), and c) b replacing the input binary image plane With one or a combination of, all or part of the binary descriptors generated at step c).

According to an embodiment, the processing circuit is configured to, at the end of step d), repeat steps a), b), and c) by replacing the input binary image plane with one or a combination of all or part of the binary descriptors of decreased dimensions generated at step d).

According to an embodiment, the pixels of the sensor are arranged in an array of rows and columns, the sensor further comprising a control circuit configured to successively select the pixels, row by row, according to a control method of rolling shutter type.

According to an embodiment, the control circuit of the sensor further comprises a quantization circuit capable of comparing an output signal of each pixel of the selected row with a threshold and of delivering a binary output value representative of the result of the comparison.

Another embodiment provides a method of generation, by means of a processing circuit, of descriptors of a scene captured by an image sensor comprising a plurality of pixels, the sensor being configured to, during an acquisition phase, successively supply S binary image planes, each comprising a single binary value per pixel, S being an integer greater than or equal to 2, the method comprising the successive steps of:
  a) calculating N convolutions of the binary image plane with respectively N distinct convolution kernels, to provide N convolved images N being an integer greater than or equal to 2;
  b) generating at least one meta image from the N convolved images supplied at step a); and
  c) for each of the N convolved images supplied at step a), generating a binary descriptor from said convolved image and from said at least one meta-image.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the present disclosure essentially concerns a system and a method for generating descriptors of a scene captured by an image sensor. The uses that can be made of such descriptors and the various descriptor parameterizing possibilities have not been detailed, the described embodiments being compatible with all or most known applications using image descriptors, for example, for applications of automatic detection of an element in an image, and the parameterizing of the descriptors according to the considered application being within the abilities of those skilled in the art.

Further, in the examples described hereafter, the forming of the internal circuits of the image sensors, and particularly of the pixels and of the peripheral control and readout circuits, has not been detailed. Further, the forming of a processing circuit capable of implementing the provided descriptor generation method has not been detailed, the forming of such a circuit being within the abilities of those skilled in the art based on the indications of the present disclosure. It should be noted that the processing circuit may be partially or totally integrated hi the same semiconductor chip as the image sensor, or may be integrated in a semiconductor chip external to the image sensor.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, the expressions "around", "approximately", "substantially" and "in the order of" signify within 10%, and preferably within 5%.

Figure 1:
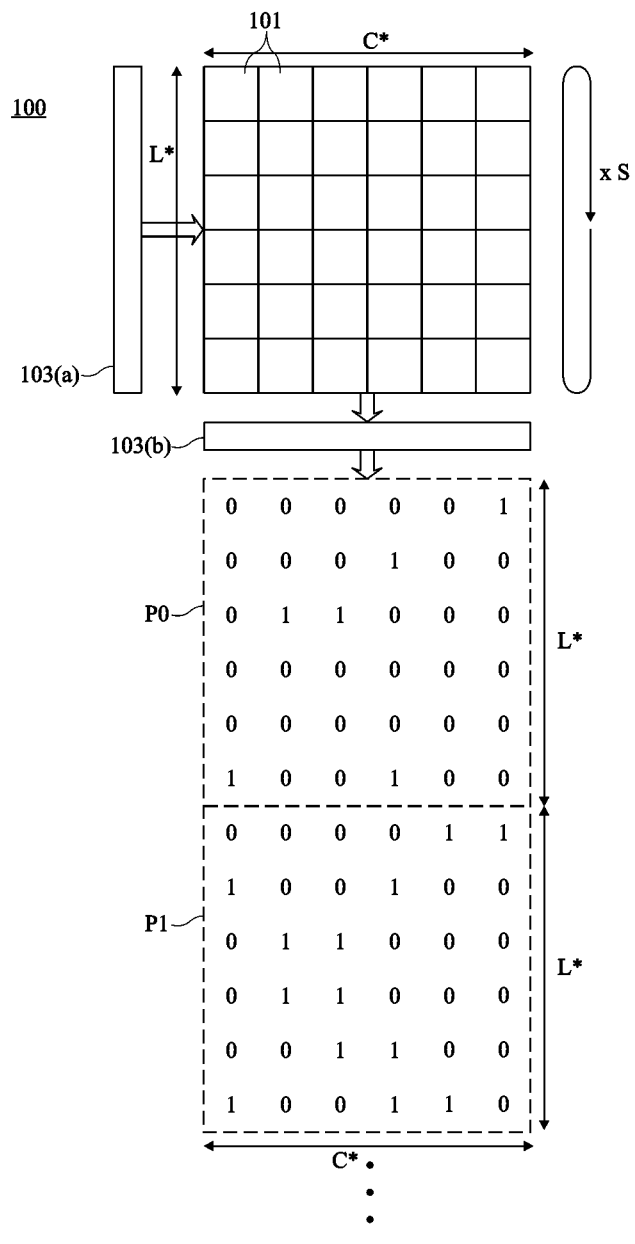
FIG. 1 schematically shows an example of an image sensor capable, during an acquisition phase, of supplying a plurality of successive binary image planes.

FIG. 1 very schematically shows an example of an image sensor 100 capable, during an acquisition phase, of supplying a plurality of successive binary image planes.

The sensor of FIG. 1 comprises a plurality of pixels 101, for example, identical or similar, arranged in an array of L* rows and C* columns, where L* and are integers greater than or equal to 2. Each pixel 101 for example comprises a photodiode and a readout node (not detailed in the drawing) and is capable of supplying on its readout node an output signal, for example, a voltage, representative of a quantity of light energy received by the photodiode dining a pixel integration phase. The sensor further comprises a control circuit 103 configured to, during an acquisition phase, successively select each pixel 101 a number S of times (S being an integer greater than or equal to 2) without resetting the pixel readout node between the first and the last selection of the pixel and, for each selection of a pixel, compare the output, signal of the pixel with a quantization threshold and read a binary signal ($B_{OUT}$) representative of the result of the comparison. The sequence of S binary samples thus obtained forms the output value of the pixel.

In the representation of FIG. 1, control circuit 103 is divided circuit 103($a$), capable of successively selecting the pixels, row by row, and a quantization circuit over 1 bit or thresholding circuit 10($b$), capable of comparing the output signal of each pixel of the selected row with a quantization threshold and of supplying a binary output sample representative of the result of the comparison.

In this example, the pixel rows are successively selected according to a control method of rolling shutter type. All the pixel rows of the sensor are successively scanned S times. For each selection of a pixel row, the pixels in the row are simultaneously quantized (in parallel) by quantization circuit 103($b$). At the end of each scanning of the L* rows of the sensor, a binary image plane Ps of dimension. C**L* is obtained, s being an integer in the range from 1 to S. Each binary image plane Ps comprises a single binary value per pixel. In FIG. 1, two successive binary image planes P0 and P1 have being shown as an illustration.

As an example, for each pixel, the S successive selections of each pixel row are performed during a same phase of integration of the pixel row. The quantization threshold applied to each pixel in the row by circuit 103($b$) may be constant all along the integration phase. For a given pixel, the position of the transition edge between the low state and the high state in the binary output sequence is representative of the light intensity received by the pixel during the integration phase. The time interval between two successive selections of each pixel row is for example substantially constant all along the pixel row integration phase. As a variation, the time interval between two successive selections of each pixel row varies during the integration phase in a way which is inversely proportional to die rank of the first one of the two selections among the S successive selections of the pixel row.

As a variation, die S successive selections of each pixel row, instead of being performed during the phase of integration of the pixels in the row, are performed during a readout phase following the phase of integration of the pixel row. The quantization threshold applied to each pixel in the row by circuit 103($b$) may then vary monotonously all along the readout phase.

Figure 2:
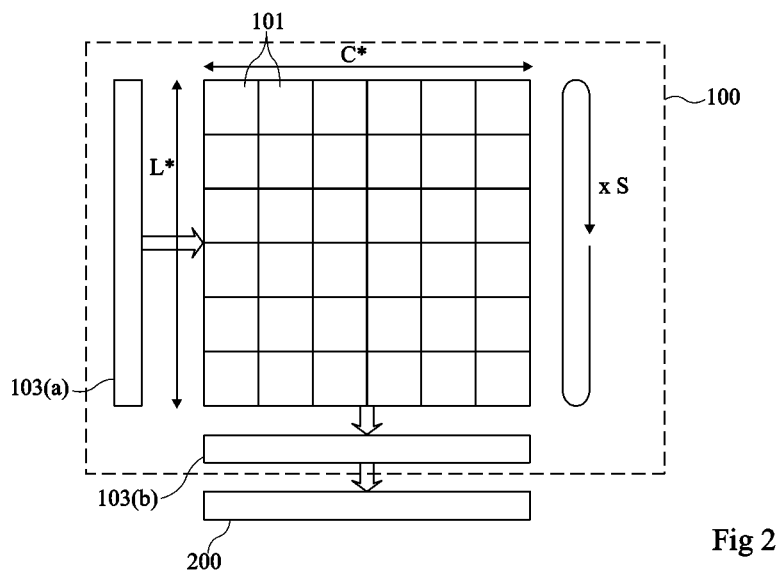
FIG. 2 schematically shows an example of a descriptor generation system according to an embodiment.

More detailed embodiments of a sensor of the type described in relation with FIG. 2 are for example described in above-mentioned patent applications EP3319311 and US20180124348, which is incorporated herein by reference.

FIG. 2 schematically shows an example of a scene descriptor generation system according to an embodiment.

The system of FIG. 2 comprises a sensor 100 of the type described in relation with FIG. 1, configured to during an acquisition phase, successively supply a plurality of binary image planes, each comprising a single binary value per pixel.

It is here desired to generate, for each binary image plane Ps supplied by sensor 100, a plurality of descriptors enabling to highlight information of interest in the image, for example, to detect predetermined elements in the image and/or to implement classification operations.

For this purpose, the system of FIG. 2 comprises an electronic processing circuit 200 capable of processing binary image planes Ps on the fly to extract binary descriptors therefrom. As an example, processing circuit 200 is capable, at each acquisition of a binary image plane Ps and before the supply of the next binary image plane, of implementing a method enabling to extract from binary image plane Ps a plurality of binary descriptors. Such an on-the-fly processing of the binary image planes may possibly enable to limit data storage memory needs since it is then not necessary to simultaneously store ail the S binary image planes Ps to generate the descriptors.

Figure 3:
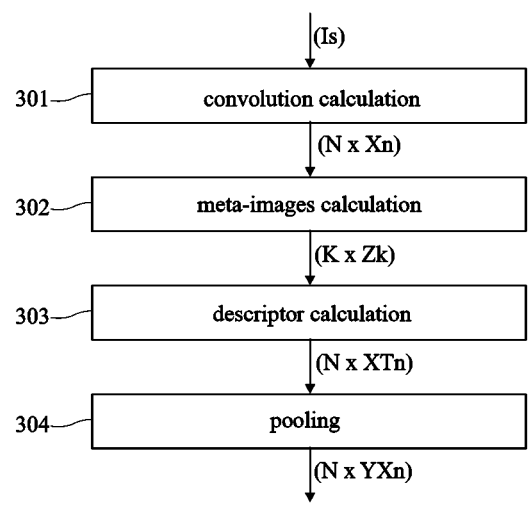
FIG. 3 schematically shows an example of a descriptor generation method according to an embodiment.

FIG. 3 schematically shows, in the form of blocks, an example of a method of extraction of binary descriptors implemented by processing circuit 200 at each acquisition of a binary image plane Ps by sensor 100.

The processing method of FIG. 3 may be applied to the complete image plane Ps or to a binary sub-image formed by a portion only of the pixels of image plane Ps. As an example, image plane Ps is broken down into a plurality of sub-images of same dimensions, the processing method being applied in parallel to the different sub-images. The different sub-images may for example be formed of pixels having different pitches between pixels in image plane Ps. This particularly enables to perform a same processing (search for predetermined elements, classification, etc.) at different scales in image plane Ps (multi-scale processing). Further, the same processing may be applied several times with different parameters to a same sub-image, for example, to search for different classes of predetermined elements in a same sub-image (multi-class processing).

A routing circuit, not detailed in FIG. 2, may be arranged between quantization circuit 103(b) and processing circuit 200 to supply processing circuit 200 with the binary sub-image(s) to be processed.

For the rest of the disclosure, it is considered that at each scanning of the L* sensor rows, processing circuit 200 receives a binary image plane Is of dimensions C×L corresponding to the complete binary image plane Ps (that is, C=C* and L=L*), or to a portion of binary image plane Ps, C, and L being integers greater than or equal to 2 respectively designating the number of columns and the number of rows of binary image plane Is. In practice, processing circuit 200 may be configured to, at each scanning of the L* sensor rows, receive and process in parallel a plurality of binary image planes Is of dimensions C×L.

The processing method of FIG. 3 comprises a step 301 of calculation of N convolutions of binary image plane Is with respectively N distinct convolution kernels or masks $\Omega n$, N being an integer greater than or equal to 2 and n being an integer in the range from 1 to N, to generated N convolved images Xn. The N convolution kernels $\Omega n$ preferably have the same dimensions $C_\Omega \times L_\Omega$. The N convolved images Xn then all have the same dimensions C'×L', with, for example (to take edge effects into account). $C'=C-(C_\Omega-1)$ and $L'=L-(L_\Omega-1)$. Preferably, each of convolution kernels $\Omega n$ only comprises binary coefficients (0 or 1), which enables to simplify the implementation of the convolution calculations by processing circuit 200. The forming and the optimization of a circuit capable of implementing such convolution operations, preferably with binary weights, is within the abilities of those skilled in the art.

Figure 4:
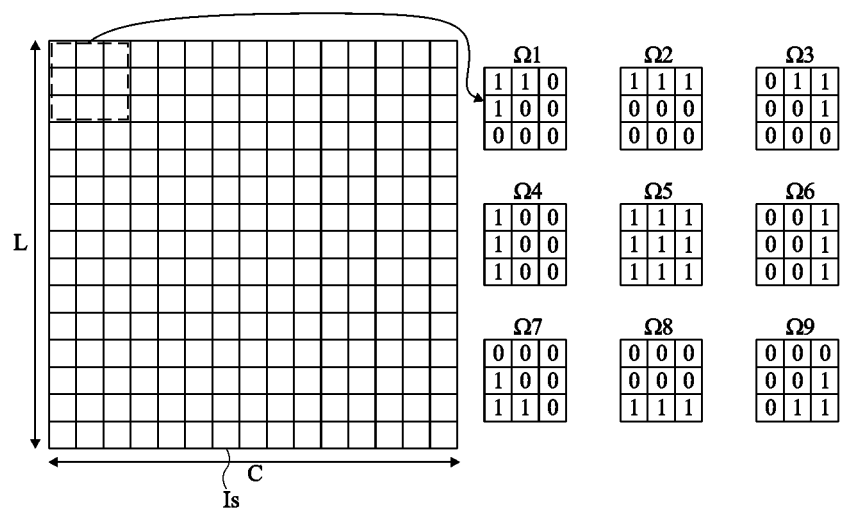
FIG. 4 illustrates in further detail an example of implementation of a step of the method of FIG. 3.

FIG. 4 illustrates in further detail an example of implementation of step 301. In this example, N=9 convolutions of binary image plane Is are calculated, to obtain N convolved images Xn=I*$\Omega n$. Convolution kernels $\Omega n$ have dimension $C_\Omega \times L_\Omega = 3 \times 3$ in this example. Convolution kernels $\Omega n$ are for example defined as follows:

$$\Omega 1 = \begin{bmatrix} 1 & 1 & 0 \\ 1 & 0 & 0 \\ 0 & 0 & 0 \end{bmatrix} \quad [\text{Eq. 1}]$$

$$\Omega 2 = \begin{bmatrix} 1 & 1 & 1 \\ 0 & 0 & 0 \\ 0 & 0 & 0 \end{bmatrix} \quad [\text{Eq. 2}]$$

$$\Omega 3 = \begin{bmatrix} 0 & 1 & 1 \\ 0 & 0 & 1 \\ 0 & 0 & 0 \end{bmatrix} \quad [\text{Eq. 3}]$$

-continued $$\Omega 4 = \begin{bmatrix} 1 & 0 & 0 \\ 1 & 0 & 0 \\ 1 & 0 & 0 \end{bmatrix} \quad [\text{Eq. 4}]$$

$$\Omega 5 = \begin{bmatrix} 1 & 1 & 1 \\ 1 & 1 & 1 \\ 1 & 1 & 1 \end{bmatrix} \quad [\text{Eq. 5}]$$

$$\Omega 6 = \begin{bmatrix} 0 & 0 & 1 \\ 0 & 0 & 1 \\ 0 & 0 & 1 \end{bmatrix} \quad [\text{Eq. 6}]$$

$$\Omega 7 = \begin{bmatrix} 0 & 0 & 0 \\ 1 & 0 & 0 \\ 1 & 1 & 0 \end{bmatrix} \quad [\text{Eq. 7}]$$

$$\Omega 8 = \begin{bmatrix} 0 & 0 & 0 \\ 0 & 0 & 0 \\ 1 & 1 & 1 \end{bmatrix} \quad [\text{Eq. 8}]$$

$$\Omega 9 = \begin{bmatrix} 0 & 0 & 0 \\ 0 & 0 & 1 \\ 0 & 1 & 1 \end{bmatrix} \quad [\text{Eq. 9}]$$

In this example, the N convolved images Xn obtained at the end of step 301 are non-binary images.

The method of FIG. 3 further comprises a step 302 of generation of K meta-images or intermediate images Zk from the set of the N convolved images Xn calculated at step 301, K being an integer greater than or equal to 1 and k being an integer in the range from 1 to K.

The K meta-images Zk calculated at step 302 are for example of same dimensions C'×L' as the N convolved images Xn calculated at step 301. As an example, for each meta-image Zk, each pixel value of meta-image Zk is equal to the result of a mathematical function fk having as inputs the N values of pixels of same position in the N convolved images Xn. Functions fk are preferably statistical functions, for example, the average, the median, the maximum, the minimum, the standard deviation, etc.

As an example, in the case where step 301 is implemented in accordance with the example of FIG. 4, a single meta-image Z1 can be calculated at step 302 (K=1), function f1 being defined as follows:

$$Z1(c',l')=f1(Xn(c',l'))=\text{man}(\max(Xn\backslash 5(c',l'))2), \quad [\text{Eq. 10}]$$

that is:

$$Z1(c',l')=\max(\max(X1(c',l'),X2(c',l'),X3(c',l'),X4(c',l'), X6(c',l'),X7(c',l'),X8(c',l'),X9(c',l')),2) \quad [\text{Eq. 11}]$$

In the above-mentioned equations Eq. 10 and Eq. 11, c' is an integer in the range from 1 to C', l' being an integer in the range from 1 to L', $Z1(c',l')$ designates the value of the pixel of position c',l' in meta-image Z1, $Xn(c',l')$ designates the value of the pixel of position c',l' in image Xn, and $Xn\backslash 5$ designates the assembly of images Xn except for image X5 (n but 5).

The method of FIG. 3 further comprises a step 303 of calculation, for each of the N convolved images Xn calculated at step 301, of a binary descriptor XTn, by means of a logic function with a binary output ln taking as inputs image Xn and the meta-image(s) Zk calculated at step 302. Descriptors XTn are for example binary planes of same dimensions as convolved images Xn and meta-images Zk. Each function ln for example is a point-to-point function, that is, for each position in descriptor XTn, value $XTn(c',l')$ is defined by the binary output of function ln according to the pixel values of same position in convolved images Xn and in meta-images Zk, that is:

$$XTn(c',l')=\ln(X1(c',l'), \ldots, XN(c',l'), Z1(c',l'), \ldots, ZK(c',l'))$$ [Eq. 12]

Logic functions ln may be functions with a signed binary output, or functions with an unsigned binary output.

As an example, in the case where step 301 is implemented in accordance with the example of FIG. 4 and where, at step 302 a single meta-image Z1 as defined in above-mentioned equations Eq. 10 and Eq. 11, functions ln can be defined as follows (in Boolean notation):

$$XTn\backslash 5(c',l') = ((X5(c',l') - Xn(c',l') \leq 2) \&\& (Xn(c',l') \geq Z1(c',l'))$$ Eq. 13 and:

$$XT5(c',l') = (X5(c',l') \geq 5)$$ [Eq. 14]

In other words, for any n but n=5, $XTn(c',l')$ is in a high state if difference $X5(c',l')-Xn(c',l')$ is smaller than or equal to 2 and if value $Xn(c',l')$ is greater than or equal to $Z1(c',l')$, and in a low state in the opposite case. For n=5, $XT5(c',l')$ is in a high state if value $X5(c',l')$ is greater than or equal to 5, and in a low state in the opposite case.

The method of FIG. 3 may further comprise an optional pooling step 304 aiming at decreasing the dimensions of the binary descriptors. More particularly, at step 304, each binary descriptor XTn is divided into a plurality of groups of distinct pixels, for example, of same dimensions. For each group of pixels, a single binary value is generated from the binary values of the pixels in the group by means of a pooling function p. Based on each binary descriptor XTn of dimensions C'×L', a binary descriptor YTn of dimensions (C'/g)×(L'/h) is thus generated, g and h respectively designating the dimension in the column direction and the dimension in the row direction of the pixel groups to which pooling function p is applied. Pooling function p for example comprises selecting the maximum of the group of pixels (logic function OR).

As an example, the pixel sub-groups are groups of (g=8)×(l=8) neighboring pixels. Pooling function p is for example a function of maximum-median-maximum type comprising, in each group of 8×8 pixels:
dividing the group into sub-groups of 2×2 neighboring pixels and only keeping the maximum of each sub-group, to obtain an array of 4×4 binary values:
dividing the array of 4×4 binary values into sub-arrays of 2×2 neighboring binary values and only keeping a logic 1 if the sub-array comprises at least two values at state 1, and a logic 0 if the sub-array comprises less than two values at state 1, to obtain an array of 2×2 binary values; and
only keeping the maximum of the array of 2×2 binary values.

It should be noted that steps 301, 302, 303 and, possibly, 304, may be repeated by re-injecting at the input of the processing circuit binary descriptors XTn or YTn or a combination of binary descriptors XTn or YTn (instead of binary image planes Is).

The method of FIG. 3 may be repeated each time a binary image plane Is by the sensor is supplied, Thus, for each of the S binary image planes Is supplied by the sensor, N descriptors XTr in the form of binary image planes of dimension C'×L' or, possibly, N descriptors YTn in the form of binary image planes of dimensions (C'/g)×(L'/h), are obtained.

For each index n in the range from 1 to N, the S binary descriptors XTn or YTn of same index n may be digitally integrated, that is, added point by point, as they are supplied by processing circuit 200 to obtain, at the end of the acquisition phase, N non-binary descriptors of dimensions C'×L' or (C'/g)×(L'/h). Such non-binary descriptors may then be used for applications of analysis of various scenes, for examples, applications of detection of predetermined elements in the scene and/ex to implement classification operations.

As a variation, after each iteration of the method of FIG. 3, an operation of projection of binary descriptors XTn or YTn in a representation space better adapted to the considered application may be implemented. As an example, binary descriptors XTn or YTn are concatenated in a vector X of dimension N×C'×L' or in a vector Y of dimensions N×(C'/g)×(L'/h). Vector X or is then multiplied by a transition matrix with binary or non-binary coefficients. The transition matrix is for example generated by training so that the result of the multiplication is a vector Vs highlighting desired specific characteristics of the scene in the considered application. The S vectors Vs may be digitally integrated, that is, added point by point, as they are supplied by processing circuit 200, to obtain, at the end of the acquisition phase, a single descriptor vector V for example capable of being used in a decision process relative to the classifying of the corresponding portion of the scene seen by the sensor into one among a plurality of predetermined classes.

Examples of on-the-fly bitstream processing methods are for example described in above-mentioned patent applications EP3319311 and US20180124348. It should further be noted that it will be within the abilities of those skilled in the art to provide different variants and topologies of neural networks according to the type of inference problem to be addressed.

Various embodiments and variants have been described. Those skilled in the art will understand that certain features of these various embodiments and variants may be combined, and other variants will occur to those skilled in the art. In particular, the described embodiments are not limited to the above-described examples of parameterizing of the descriptor generation method. In particular, other convolution kernels □n as those of the example of FIG. 4 may be used to generate convolved images Xn. Further, other functions Ic than those described hereabove may be used to generate meta-images Zk. Further, other logic functions ln than those described hereabove may be used to generate binary descriptors XTn. Further, other pooling functions p than those described hereabove may be used to generate the binary descriptors of decreased dimensions YTn from binary descriptors XTn. More generally, it will be within the abilities of those skilled in the art to adapt the parameterizing of the method of generating descriptors according to the considered application.

Finally, the practical implementation of the embodiments and variants described herein is within the capabilities of those skilled in the art based on the functional indications provided hereinabove. In particular, the forming of processing circuit 200 capable of implementing the processing method described in relation with FIG. 3 is within the abilities of those skilled in the art based on the indications of the present disclosure.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A scene descriptor generation system, comprising:
an image sensor comprising a plurality of pixels, the sensor being configured to, during an acquisition phase, select successively each pixel a number S of times without resetting a readout node of the pixel between the first and the last selection, and, at each selection of the pixel, compare an output signal of the pixel to a quantization threshold and provide a binary value representative of the result of the comparison, so as to successively supply S binary image planes, each comprising a single binary value per pixel, S being an integer greater than or equal to 2; and
a processing circuit configured to, for each binary image plane supplied by the sensor, implement the successive steps of:
a) calculating N convolutions of the binary image plane with respectively N distinct convolution kernels, to provide N convolved images, N being an integer greater than or equal to 2;
b) generating at least one meta-image from the N convolved images supplied at step a); and
c) for each of the N convolved images supplied at step a), generating a binary descriptor from said convolved image and from said at least one meta-image, the processing circuit being further configured to, after the acquisition phase, implement a step of analyzing the N*S generated binary descriptors.

2. The system according to claim 1, wherein the processing circuit is configured to, after step c), repeat steps a), b), and c) by replacing the input binary image plane with one or a combination of all or part of the binary descriptors generated at step c).

3. The system according to claim 1, wherein the pixels of the sensor are arranged in an array of rows and columns, the sensor further comprising a control circuit configured to successively select the pixels, row by row, according to a control method of rolling shutter type.

4. The system according to claim 3, wherein the control circuit of the sensor further comprises a quantization circuit capable of comparing an output signal of each pixel of the selected row with a threshold and of delivering a binary output value representative of the result of the comparison.

5. A method of generation, by means of a processing circuit, of descriptors of a scene captured by an image sensor comprising a plurality of pixels, the sensor being configured to, during an acquisition phase, select successively each pixel a number S of times without resetting a readout node of the pixel between the first and the last selection, and, at each selection of the pixel, compare an output signal of the pixel to a quantization threshold and provide a binary value representative of the result of the comparison, so as to successively supply S binary image planes, each comprising a single binary value per pixel, S being an integer greater than or equal to 2, the method comprising the successive steps of:

a) calculating N convolutions of the binary image plane with respectively N distinct convolution kernels, to supply N convolved images, N being an integer greater than or equal to 2;
b) generating at least one meta-image from the N convolved images supplied at step a); and
c) for each of the N convolved images supplied at step a), generating a binary descriptor from said convolved image and from said at least one meta-image, the processing circuit being further configured to, after the acquisition phase, implement a step of analyzing the N*S generated binary descriptors.

6. The system according to claim 1, wherein:
the processing circuit comprises a circuit configured to implement the convolution calculations of step a);
the processing circuit is configured such that, at step b), said at least one meta-image is generated by means of a statistic function from the N convolved images provided at step a); and
the processing circuit is configured such that, at step c), the binary descriptor is generated by means of a logical function with a binary output, from said convolved image and said at least one meta-image.

7. The system according to claim 6, wherein the processing circuit is configured so that the N convolved images supplied at step a) and said at least one meta-image generated at step b) have same dimensions, and so that each pixel value of said at least one meta-image is equal to the result of said statistical function, said statistical function having as inputs the N values of pixels of same position in the N convolved images.

8. The system according to claim 7, wherein the processing circuit is configured so that said statistical function comprises at least one function from the group comprising the maximum, the average, the median, the minimum, and the standard deviation.

9. The system according to claim 7, wherein the processing circuit is configured so that the N binary descriptors supplied at step c) are binary images of same dimensions as the N convolved images supplied at step a) and as said at least one meta-image generated at step b).

10. The system according to claim 9, wherein the processing circuit is configured so that, for each of the N binary descriptors supplied at step c), each pixel value of the binary descriptor is equal to the result of a logic function with a binary output, said logic function receiving as an input only values from the group comprising the N values of pixels of same position in the N convolved images and the value of the pixel of same position in said at least one meta-image.

11. The system according to claim 10, wherein the processing circuit is further configured to, for each binary image plane supplied by the sensor, after step c), implement the step of:
d) for each of the N binary descriptors, apply to the descriptor a pooling function to generate a binary descriptor of decreased dimensions.

12. The system according to claim 11, wherein the processing circuit is configured to, at the end of step d), repeat steps a), b), and c) by replacing the input binary image plane with one or a combination of all or part of the binary descriptors of decreased dimensions generated at step d).

* * * * *